United States Patent
Watt et al.

(10) Patent No.: US 7,430,743 B2
(45) Date of Patent: Sep. 30, 2008

(54) SYSTEM AND METHOD FOR HOSTING AN APPLICATION IN ONE OF A PLURALITY OF EXECUTION ENVIRONMENTS

(75) Inventors: Murray E. Watt, Redmond, WA (US); Mark A. Alcazar, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 716 days.

(21) Appl. No.: 10/376,360

(22) Filed: Feb. 27, 2003

(65) Prior Publication Data

US 2004/0172635 A1 Sep. 2, 2004

(51) Int. Cl.
*G06F 3/00* (2006.01)
*G06F 9/44* (2006.01)
*G06F 9/445* (2006.01)

(52) U.S. Cl. .................. 719/311; 717/173; 717/178
(58) Field of Classification Search ......... 709/201–207, 709/217–219; 717/168–178; 715/740, 749; 719/311
See application file for complete search history.

(56) References Cited

U.S. PATENT DOCUMENTS

| | | | |
|---|---|---|---|
| 6,125,402 A * | 9/2000 | Nagarajayya et al. ....... | 719/330 |
| 6,289,512 B1 * | 9/2001 | Edwards et al. ............ | 717/178 |
| 6,401,134 B1 | 6/2002 | Razavi et al. | |
| 6,546,554 B1 * | 4/2003 | Schmidt et al. ............ | 717/176 |
| 6,571,389 B1 * | 5/2003 | Spyker et al. .............. | 717/176 |
| 6,769,123 B1 * | 7/2004 | Chan ......................... | 719/315 |
| 6,981,281 B1 | 12/2005 | Lamacchia et al. | |
| 2002/0147974 A1 * | 10/2002 | Wookey ..................... | 717/176 |
| 2003/0195923 A1 | 10/2003 | Bloch et al. | |
| 2003/0204843 A1 * | 10/2003 | Barmettler et al. .......... | 717/178 |
| 2004/0015839 A1 | 1/2004 | Sarkar et al. | |
| 2004/0073904 A1 | 4/2004 | Hill | |
| 2004/0172443 A1 | 9/2004 | Alcazar et al. | |
| 2004/0172635 A1 | 9/2004 | Watt et al. | |
| 2004/0187023 A1 | 9/2004 | Alagna et al. | |
| 2006/0184931 A1 | 8/2006 | Rochette et al. | |

OTHER PUBLICATIONS (Unpublished) U.S. Appl. No. 10/974,422, filed on Oct. 26, 2004 by Anderson et al., entitled "Hosting Environment Abstraction Model for Content," which is a Parent of U.S. Appl. No. 11/031,548.
(Unpublished) U.S. Appl. No. 11/031,548, filed on Jan. 7, 2005 by Anderson et al., entitled "Object Models Enabling Hosting Content In A Plurality Of Environments," which is a Continuation of U.S. Appl. No. 10/974, 422.
(Unpublished) U.S. Appl. No. 10/715,804, filed on Nov. 18, 2003 by Goodwin et al., entitled "Application Model That Integrates The Web Experience With The Traditional Client Application Experience".

* cited by examiner

*Primary Examiner*—Meng-Ai An
*Assistant Examiner*—Charles E Anya
(74) *Attorney, Agent, or Firm*—Lee & Hayes, PLLC

(57) ABSTRACT

Described is a mechanism for executing a hosted application in either a browser-execution environment or as a standalone application. The invention provides a mechanism that enables hosting code in either of plural hosting environments. Briefly stated, code is created that executes in a common execution environment. That execution environment can be either owned by a browser or not. When the code is launched, a host sniffer component determines from an indicator within the code which hosting environment is appropriate. Based on that indicator, the code is launched in the appropriate hosting environment. The appropriate hosting environment may be either browser hosted or standalone.

31 Claims, 6 Drawing Sheets

SYSTEM AND METHOD FOR HOSTING AN APPLICATION IN ONE OF A PLURALITY OF EXECUTION ENVIRONMENTS

FIELD OF THE INVENTION

The present invention relates to software applications, and more particularly, to executing a software application in one of two different execution environments.

BACKGROUND OF THE INVENTION

The traditional software application executes in a standalone fashion on a computer. When the traditional application is invoked, a process is created in which the application executes in a standalone fashion. Users have come to expect certain characteristics of traditional, standalone applications, such as easily switching between executing applications, executing in their own windows, having document extensions associated with the application, and the like.

With the arrival of the Internet, a new type of application is becoming very popular—the "hosted" application. The term "hosted" application is often used to describe a new type of software application that is commonly deployed over the Internet. Typical hosted applications include multiple Web pages representing markup-based documents and may also include scripts or other resources. Commonly, the hosted application is stored on a Web server and downloaded to a local computer when used. In this scenario, Internet browsing software is usually used to download the hosted application and to provide an execution environment for the downloaded application. These types of applications have several benefits. For instance, browser-hosted applications have little impact on a computer when downloaded and installed. Unlike traditional applications, the code that is executed is essentially self-contained and executes within a confined execution space. Browser-hosted applications can be downloaded and installed without causing damage to existing applications installed on the computer.

Although superior to traditional applications in some ways, the conventional hosted application also suffers some shortcomings. Users have accepted certain types of applications being executed within the browsing environment. Small applets or incidental functionality on a Web page are examples. However, certain hosted applications are relatively complete and seem inappropriate when hosted in a browsing environment. For instance, users cannot switch between executing hosted-applications as easily as traditional applications. Users are sometimes confused by the relationship between the browsing software and the hosted application. This confusion often leads to some reluctance to accept the hosted application as a complete application.

As hosted applications become more and more prevalent, the software community would like to have greater acceptance by the consuming public. In order to gain that acceptance, hosted applications should be capable of behavior more like the traditional standalone software applications that consumers are already used to. However, an execution environment for hosted applications that provides some of the behavior expected of standalone applications has eluded those skilled in the art.

SUMMARY OF THE INVENTION

The present invention is directed at a mechanism for executing a hosted application in either a browser-execution environment or as a standalone application. The invention provides a mechanism that enables hosting code in either of plural hosting environments. Briefly stated, code is created that executes in a common execution environment. That execution environment can be either owned by a browser or not. When the code is launched, a host sniffer component determines from an indicator within the code which hosting environment is appropriate. Based on that indicator, the code is launched in the appropriate hosting environment. The appropriate hosting environment may be either browser hosted or standalone.

In one aspect, an application includes a declarative indicator of an appropriate hosting environment. The indicator may take the form of a byte signature associated with the appropriate hosting environment, or an entry in a manifest file associated with the application. If the application is launched in one hosting environment, a host sniffer evaluates the application to determine, from the declarative indicator, what the appropriate hosting environment is. If the one hosting environment is the appropriate hosting environment, the application is invoked in the one hosting environment. If the one hosting environment is not the appropriate hosting environment, the application is caused to be launched in the appropriate hosting environment.

In another aspect, a system includes a host sniffer and at least two hosting servers, one associated with a browser environment and one associated with a shell environment. A handler component, such as a browser server proxy or a shell extension handler, is used to analyze an application to determine the appropriate hosting environment. The handler component causes the application to be launched in the appropriate hosting environment.

DETAILED DESCRIPTION OF THE PREFERRED EMBODIMENT

The invention provides a mechanism that enables hosting code in either of plural hosting environments. Briefly stated, code is created that executes in a common execution environment. That execution environment can be either owned by a browser or not. When the code is launched, a host sniffer component determines from an indicator within the code which hosting environment is appropriate. Based on that indicator, the host sniffer launches the code in the appropriate hosting environment.

The invention will be described here first with reference to one example of an illustrative computing environment in which embodiments of the invention can be implemented. Next, a detailed example of one specific implementation of the invention, including certain key components, will be described. Alternative implementations may also be included with respect to certain details of the specific implementation. Finally, a process for performing the invention will be described with general reference to the preceding illustrative implementations. It will be appreciated that the invention is not limited to the specific embodiments described here.

Illustrative Computing Environment of the Invention

Figure 1:
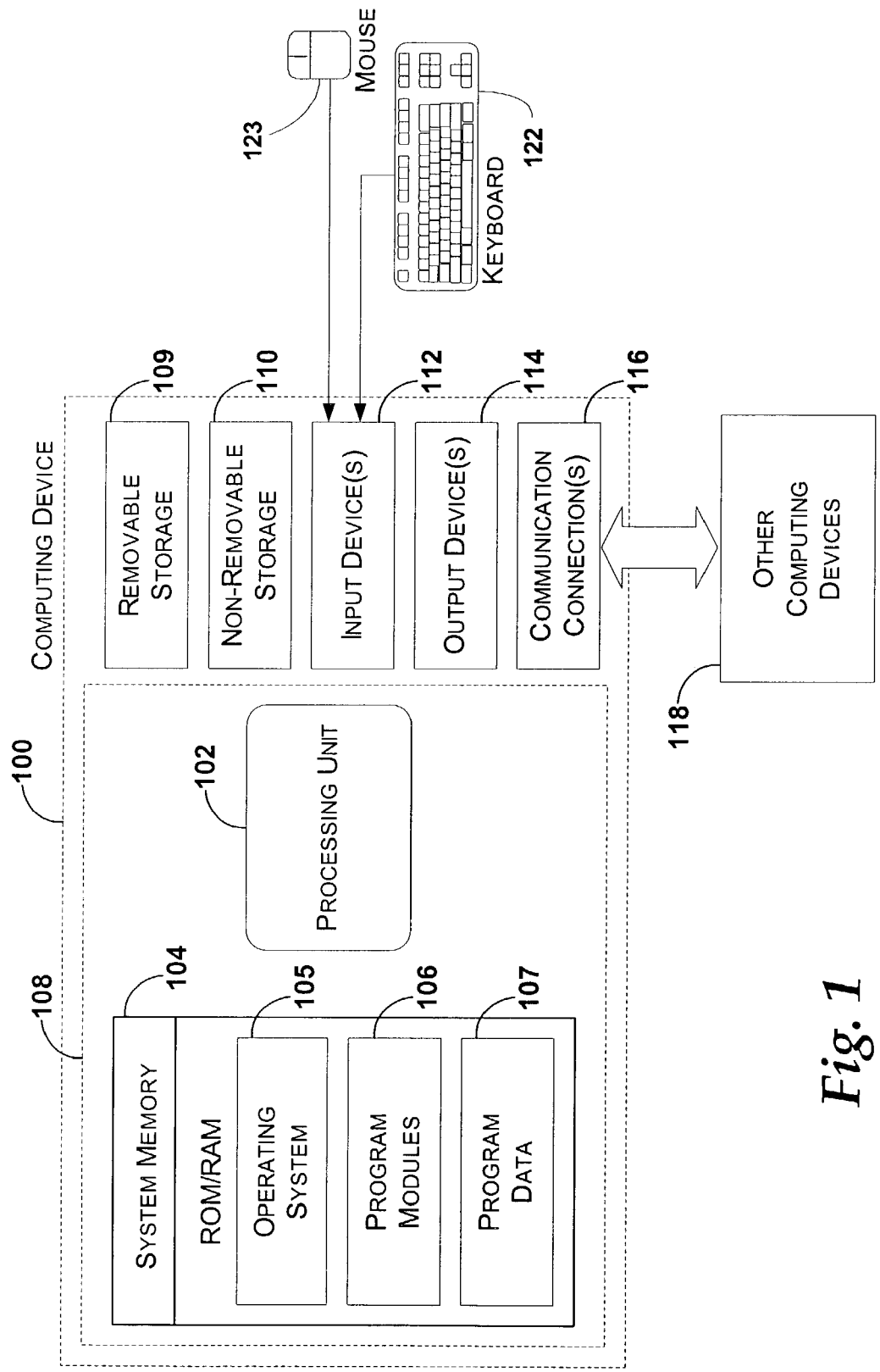
FIG. 1 is a functional block diagram that illustrates a computing device that may be used in implementations of the present invention.

FIG. 1 illustrates a computing device that may be used in illustrative implementations of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard 122, mouse 123, pen, voice input device, touch input device, scanner, etc. Output device (s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Implementation of the Invention

Figure 2:
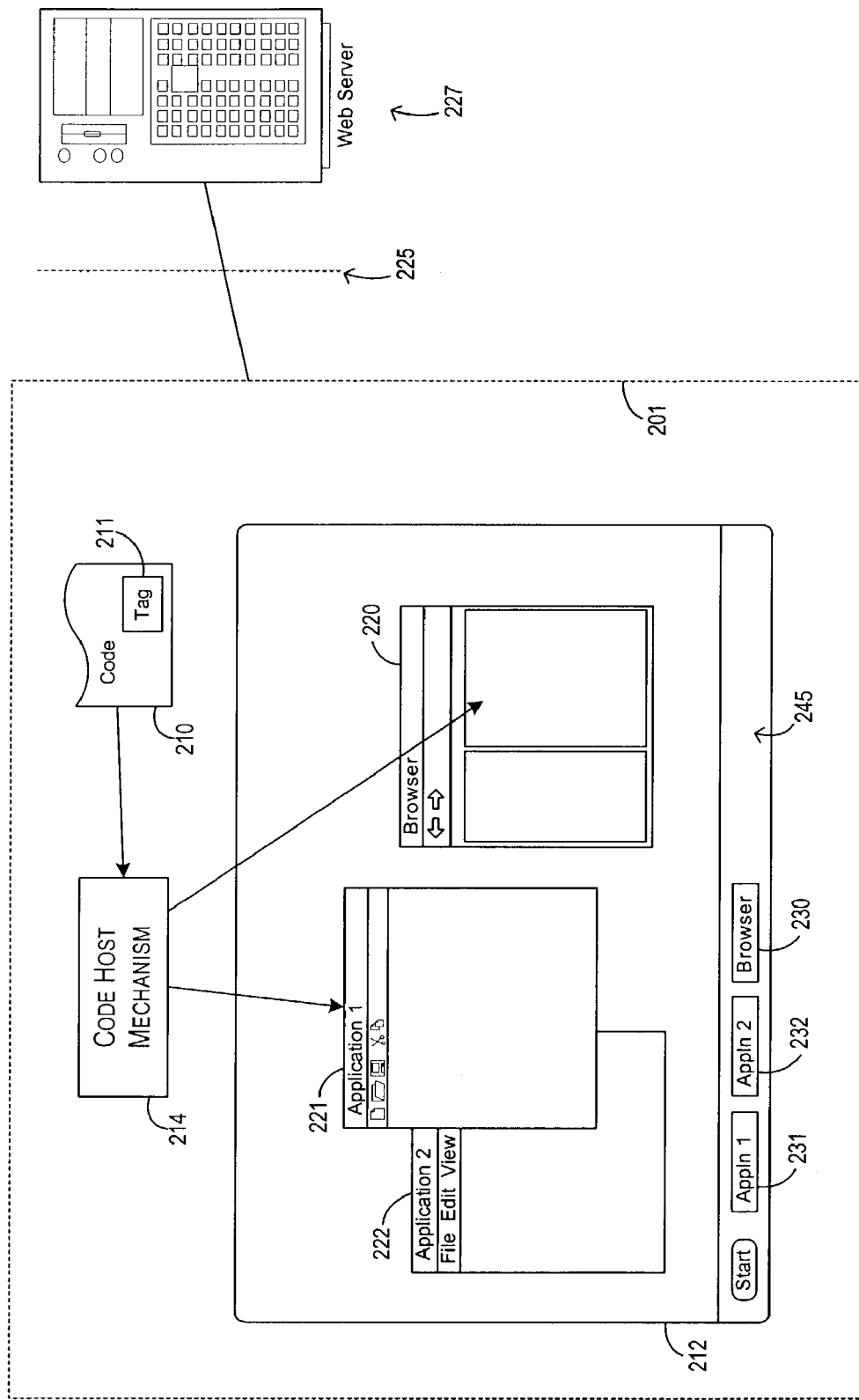
FIG. 2 is a functional block diagram generally illustrating components of one system implementing the present invention.

FIG. 2 is a functional block diagram generally illustrating components of one system implementing the present invention. Illustrated in FIG. 2 is a local computer 201 connected to a Web server 227 over a network 225, such as a local or wide area network or the Internet. The computer 201 includes a display 212 that renders images for a user to interact with applications executing on the computer 201. The display 212 illustrates the visual portion of a few applications currently executing on the computer 201. For instance, a browser 220, a first application (Application A 221) and a second application (Application B 222) are executing on the computer 201.

The browser 220 may be a portion of an operating system that is commonly used for navigating to and displaying Web-based content, such as markup pages or other remote-based resources. The browser 220 may have associated engines or other components that are each called upon to interpret, execute, and/or render various types of content that is presented in the browser 220. In essence, the browser 220 is an environment in which disparate content, including executable code, navigated to by a user may be presented in a consistent and predictable fashion. Executable code is hosted by the browser in a secure environment that prevents malicious code from damaging the computer 201.

Application A 221 and Application B 222 are examples of traditional standalone applications. Those applications are executing in their own windows, and may have their own specialized menu bars, toolbars, and other characteristics. Users today have come to expect certain behavior from standalone applications. For instance, the user may easily switch between executing applications by clicking a button on a task bar 245 corresponding to the desired application. In this example, one button (button 230) is associated with the browser 220, another button (button 231) is associated with Application A 221, and yet another button (button 232) is associated with Application B 222.

The present invention provides a mechanism through which the code 210 can be hosted on the computer 201 either as a standalone application (e.g., Application A 221) or in the browser 220. It is not particularly important to the invention how the code 210 came to reside on the computer 201, although it is envisioned that the code 210 could be downloaded from the Web server 227 over the network 225 or the Internet. Broadly stated, a code host mechanism 214 is resident on the computer 201 and operates to determine from the code 210 whether to execute the code 210 in the browser 220 or as a standalone application.

It is important to note that unlike existing technologies, the code 210 is essentially identical in either case, and the determination is made from a declarative identifier (e.g., tag 211) associated with or within the code 210 itself. When launched, the code host mechanism 214 determines what execution environment in which to invoke the code 210. In this embodiment, that determination is made by evaluating the tag 211 associated with the code. The tag 211 indicates whether to run the code 210 standalone or in the browser 220. Based on that determination, the code host mechanism 212 invokes the code 210 in the proper environment. In the case that the tag 211 indicates a standalone application, the code is hosted by a secure execution environment as a standalone application, such as Application A 221 or Application B 222. In the case that the tag 211 indicates that the code 210 should be browser hosted, the code host mechanism 210 launches the browser 220 and invokes the code 210 within a browser-hosted secure execution environment.

Using this mechanism, developers can create essentially the same body of code that can either be executed in a standalone environment or within the browser 220. Changing the tag 211 changes which environment the code 210 will be executed in. At launch, the code host mechanism 214 determines the appropriate environment and invokes it. Although illustrated in FIG. 2 as a single component, it will be appreciated that the code host mechanism 214 is likely made up of several different components acting together, as will be made more clear from the following discussion in conjunction with the corresponding FIGURES.

Figure 3:
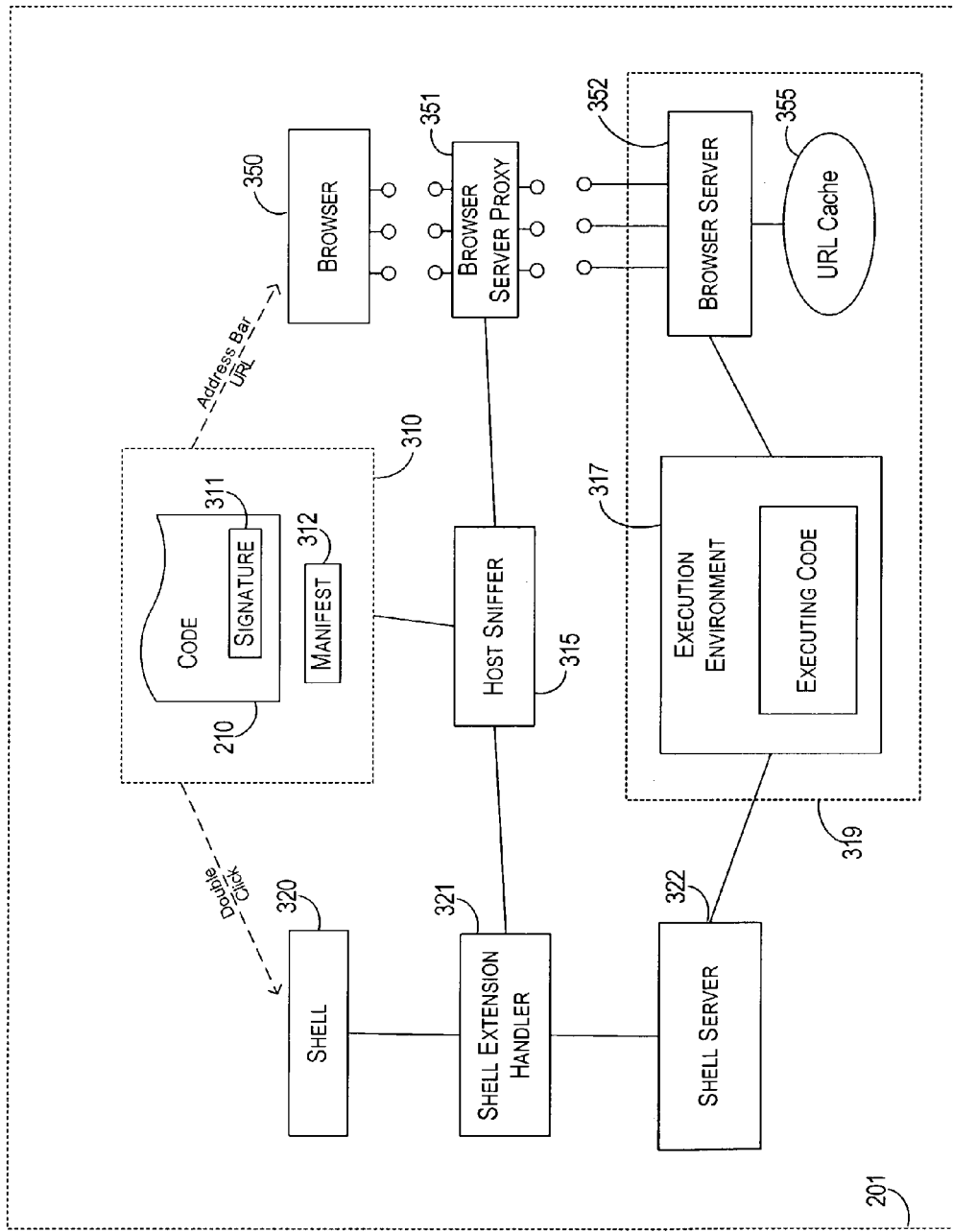
FIG. 3 is a functional block diagram illustrating in greater detail components of one illustrative system for implementing the present invention.

FIG. 3 is a functional block diagram illustrating in greater detail components of a system implementing one particular embodiment of the present invention. The components illustrated in FIG. 3 may be specific examples of one implementation of the code host mechanism 210 shown in FIG. 2. However, the components illustrated in FIG. 3 are for discussion only, and many other implementations of the code host mechanism 210 will become apparent from the following teachings.

Figure 4:
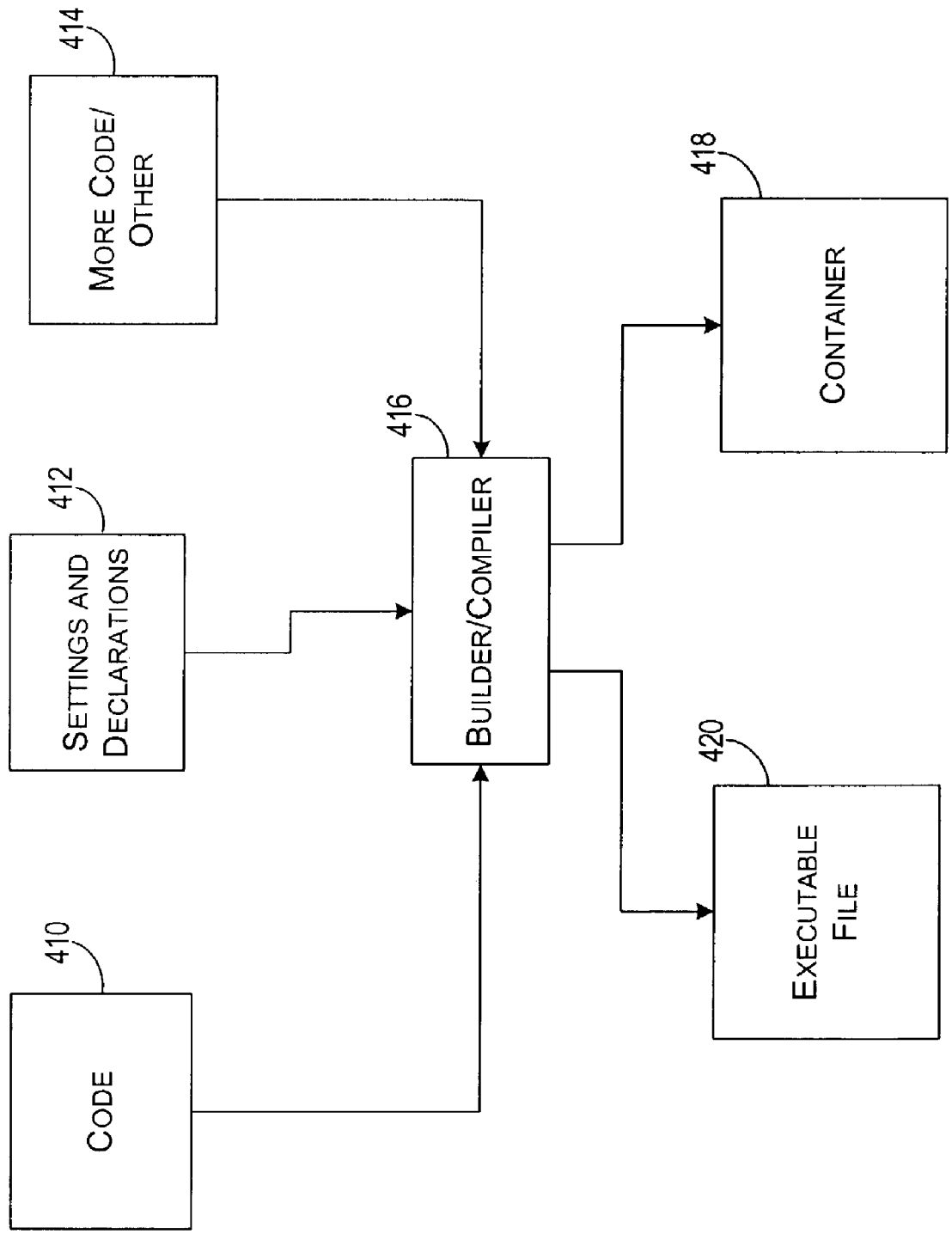
FIG. 4 is a graphical representation of a components configured to generate an application capable of being hosted in either of plural hosting environments, in accordance with one implementation of the present invention.

Shown in FIG. 3 is an executable application 310 that includes the code 210 from FIG. 2. In this implementation, the code 210 may be a container file that includes the executable code and a byte signature 311 that serves as the tag 211 from FIG. 2. In other words, the byte signature 311 identifies whether to execute the code 210 in the browser environment or in a standalone environment. FIG. 4 and the corresponding text provides an illustration of one example of how the byte signature 311 could be included into the code 210. As an alternative, a manifest 312 could be used that includes information about the executable application 310, such as whether to host the code 210 in a browser 350 or standalone.

Also shown in FIG. 3 is a host sniffer 315 that is used by certain other components to determine the host environment for the application 310. In the case where a container file is used, or if the code 210 is a compiled application, the host sniffer 315 looks for the byte signature 311. In the case of a declarative markup file, the host sniffer 315 scans the manifest 312 to determine the host environment. In one example, an application tag or the like may be included in the manifest 312. The application tag could then include a host attribute that identifies the host environment. Preferably, the host sniffer 315 does not parse the manifest 312 to avoid double parsing or unnecessarily starting the execution environment. The host sniffer 315 may be part of a small unmanaged library that can be used without the overhead of loading a DLL or significantly increasing the size of an executable.

Ultimately, the code 210 will execute in a secure execution environment 317 when the proper host (e.g., standalone or browser) is determined. Although the same execution environment 317 is used to run the code 210, it will be appreciated that the code 210 will demonstrate slightly different characteristics depending on whether it is hosted in the browser 350 or standalone. Some of those differences were described above in conjunction with FIG. 2. However, it will be appreciated that by using the same execution environment 317, the same security model is used in both cases to protect the computer 201 from malicious code.

Launching the application 310 can occur in two ways: either by activating a link to the locally stored application 310, or by providing a Universal Resource Locator (URL) through an address bar or the like. Typically, launching the code 210 locally involves activating (e.g., double-clicking) an icon or some representation of the application 310. That action is recognized by a shell 320, which launches a shell extension handler 321 registered to handle documents of the type that was activated.

In this implementation, the shell extension handler 321 is a handler component that is registered to handle certain applications, such as those having a particular application extension or mime-type, that are shell-executed and may be hosted in two different environments. When called upon, it uses the host sniffer 315 to determine the hosting environment in which to invoke the code 210. The shell extension handler 321 is configured to either instruct the shell server 322 to launch the code 210 or to invoke the browser 350 with instructions to launch the code 210, depending on the appropriate host.

The shell server 322 is invoked once it has been determined to host the code 210 in a standalone environment. To that end, the shell server 322 is configured to launch the execution environment 317 and invoke the code 210. While the code is executing, it is contained within the managed environment and subject to the security limitations imposed by the secure execution environment 317. It should be appreciated that the functions of the shell server 322 are not included in the shell extension handler 321 to avoid unnecessarily launching the execution environment 317 until it is determined which host environment is appropriate.

The browser 350 may receive instructions to launch the application 310 either by navigating to the application 310 or by being presented with the URL of the application 310 by a user, such as through an address bar or the like. Other methods may also be employed, such as another component (e.g., the shell extension handler 321) programmatically presenting the code 210 to the browser 350. When presented with the code 210, the browser 350 attempts to discern an appropriate handler based on a mime-type associated with the code 210. If the current or default handler does not recognize the mime-type, the browser 250 searches for an appropriate handler for the mime-type. In a fashion similar to the shell 320, the browser 350 will invoke the appropriate handler registered to handle the given mime-type. If no handler is registered for the particular mime-type or if the registered handler returns a failure, the browser 250 is configured to shell-execute the code 210.

The browser server proxy 351 is a handler component registered with the browser to handle mime-types associated with applications that may be hosted in more than one environment. The browser server proxy 351 is configured to determine the host environment for the application 310 using the host sniffer 315. In this embodiment, the browser server proxy 351 is configured to examine the application 310 before the entire application 310 is downloaded to the computer 201. For instance, if the application 310 is being downloaded over the network, the browser server proxy 351 has the opportunity to examine the data bits of the application 310 as it is being downloaded. In this way, the appropriate host can be determined and the execution environment set up prior to the entire application 310 arriving. This can result in a significant performance improvement because some applications can take a relatively long time to download, and launching the execution environment 317 is also a relatively complex process. Thus, launching the execution environment 317 may be started prior to the entire application arriving, which provides the user with an improved experience.

The browser server 352 is invoked once it has been determined that the code 210 is to be hosted in the browser environment. The browser server 352 launches the secure execution environment 317 and invokes the code (executing code 318). The browser server 352 operates as a document object server for the browser 350 and passes information between the secure execution environment 317 and the browser 350. In other words, the browser server 352 performs functions in the browser environment similar to the shell server 322 in the standalone environment.

In this implementation, as with the shell server 322, launching the browser server 352 is delayed until after the browser server proxy 351 determines the appropriate host. Thus, this implementation avoids unnecessarily launching the secure execution environment 317, which is an overhead-intensive task.

The secure execution environment 317 and the browser server 352 execute in a "managed" code environment 319, meaning that strict security safeguards apply to prevent that code from compromising or harming other components on the computer 201. In contrast, the browser server proxy 351 executes as unmanaged code, which provides certain benefits. For example, as unmanaged code, the browser server proxy 351 may execute in the same process as the browser 350, which is less impactful on the system. In this particular implementation, the browser server 352 handles any managed-to-unmanaged marshalling of information between itself and the browser server proxy 351.

Finally, the browser server 352 maintains a URL cache 355 to assist with constructing any relative links that may be present in the application 310. When an application or other code is accessed through the browser 350 using a URL, that URL is temporarily stored by the browser 350 so that links within the application 310 that are relative to the URL can be resolved. However, if the browser server proxy 351 returns a failure to the browser 350, which may mean that the application will be standalone hosted, the browser 350 discards its stored URL. Thus, the browser server 352 caches the URL to ensure that it is available for the shell server 322 to reconstruct any relative links when the code 210 executes in a standalone environment.

FIG. 4 is a functional block diagram illustrating components of a process for creating a container file that may be used in conjunction with the present invention. Illustrated in FIG. 4 are several files including a code file 410, a settings file 412, and other files 414. Each of these files are created by a software developer in the process of making a hosted application. The code file 410 includes markup and/or source code that defines the functionality of the application. The logic of the application resides in the code file 410. The settings file 412 includes information about how the application will be compiled and executed. In this embodiment, the settings file 412 includes an indication that the application will be either standalone or browser hosted. Other files 414 may also be used in the build process, such as other supporting code files (e.g., shared libraries) or the like.

In this embodiment, a builder/compiler 416 takes the several files (code file 410, settings file 412, and other files 414) and compiles them into a file that represents the executable application. In one embodiment, the file may be a container file 418 that includes code in an intermediate language capable of being executed on multiple platforms. In another embodiment, the file may be a conventional executable file 420 that includes executable native code capable of execution on a host computing system. In addition, the container file 418 or the executable file 420 includes an indication of whether the application should be browser hosted or standalone. The indication may take the form of a byte signature representing a particular class ID or the like associated with either browser hosted or standalone environments. At this point, the file may be served over the Internet or some other network and downloaded to a client computer. Likewise, the file may be loaded or installed onto the client computer. The systems described above can then be used on the client computer to determine the appropriate hosting environment and to launch the application in that environment. It should be noted that although the file is illustrated as a single file, it may in fact be one or more actual files.

Generalized Operation of the Illustrative Implementation

What follows are general discussions of illustrative processes that may be employed by embodiments of the invention to achieve its benefits. These processes are provided as examples to illustrate the principal of operation of the invention, and are not to be viewed as the exclusive means by which the invention may be implemented.

Figure 5:
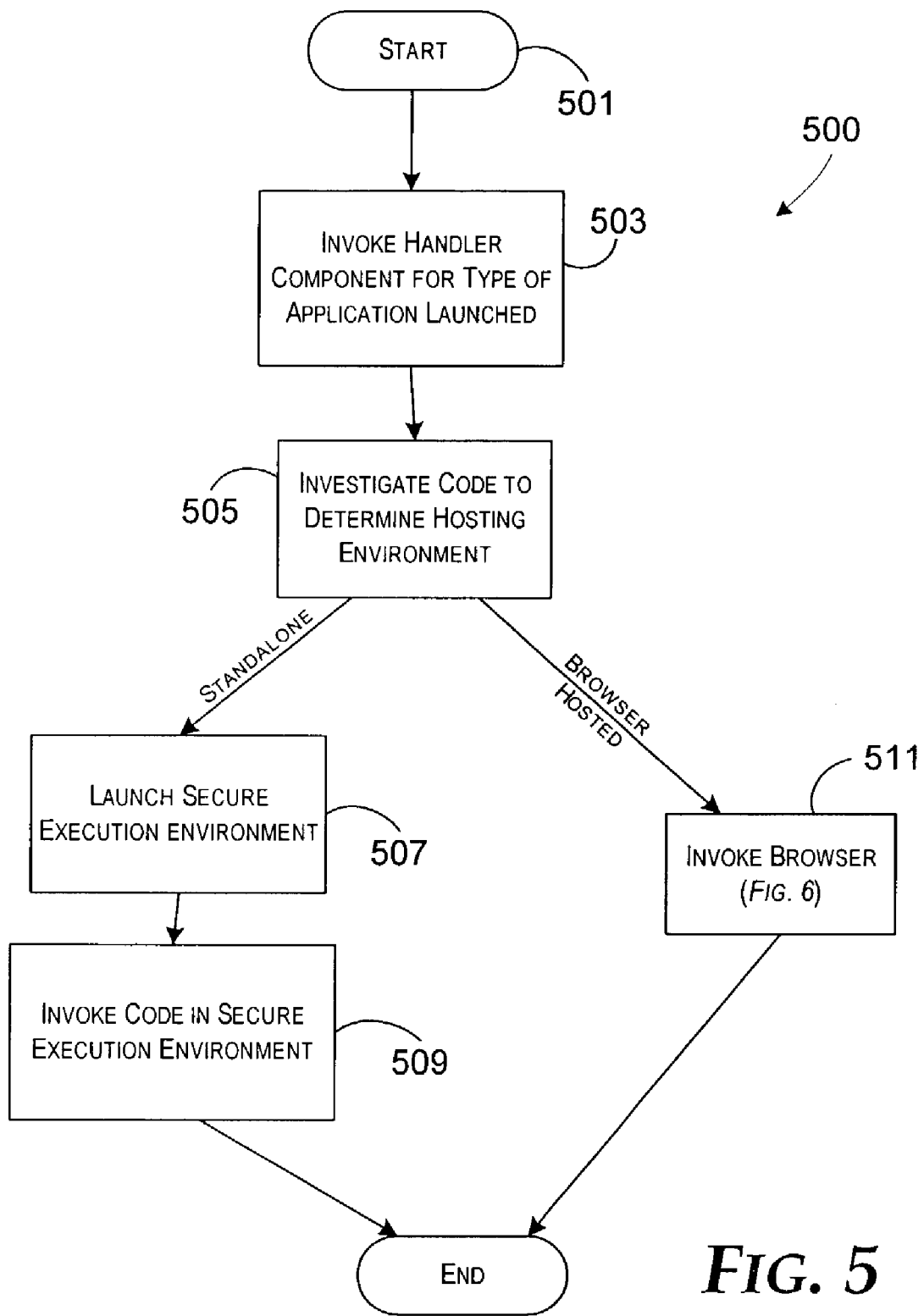
FIG. 5 is a logical state diagram generally illustrating a process for launching an application in one of plural hosting environments if launched from within a shell, in accordance with one implementation of the invention.

FIG. 5 is a logical flow diagram generally illustrating a process 500 for determining an appropriate hosting environment in which to execute an application, and for launching the application in that environment when executing locally stored software, such as in a shell environment. The process begins at a starting block 501 where an application is being executed that includes locally stored code. Generally stated, the application is executed by launching (e.g., double-clicking or otherwise activating) a reference (e.g., an icon) to the code. However, the application may also be locally executed in other ways, such as being invoked by another component.

a block 503, a shell invokes a handler component to load and launch the application. Typically, double-clicking an icon causes a shell to evaluate the type of file referenced by the icon and invoke an appropriate handler for that type. Often the type of the file is determined by an extension associated with the file and identified by the icon. The extension may be a part of a filename or other indictor of the file's type. But the icon may identify the file's type in many other ways. In one embodiment, the file may be an executable file itself. In that case, a loader component (e.g., an operating system loader) may be invoked to load the executable. In another embodiment, the file may be a type that is not directly executable. In that case, the handler component may be a shell extension handler associated with the type of application, such as a container file, that was launched.

At block 505, the handler component causes the locally stored code to be examined to determine what environment in which to host the code. In one implementation, a code host sniffer may be used whose purpose is to examine code and look for an indication of the appropriate host environment. The code host sniffer may look for a particular indication stored within the code itself, such as a byte signature, or may perhaps look for another file containing information about the code, such as a manifest file or the like. The code host sniffer may be a separate component, a part of the handler component, or even a part of the application itself. Many other means for identifying the host may also be used without departing from the spirit of the invention.

The process 500 branches based on the particular host environment discovered at block 505. If the host environment is identified as a standalone environment, the process 500 proceeds to block 507. If the host environment is identified as browser-hosted, the process 500 proceeds to block 511.

At block 507, the handler component launches a secure execution environment to host the code in standalone mode. Launching the secure execution environment is delayed until after the appropriate hosting environment is discovered to avoid starting the secure execution environment unless it should be. It will be appreciated that the handler component may indirectly launch the secure execution environment, such as by first launching a shell server responsible for launching the secure execution environment.

At block 509, the handler component invokes the code in the secure execution environment. The application executes in standalone mode outside the confines of the browser environment, yet the secure execution environment applies any security policies appropriate for the application. Again, it will be appreciated that the handler component may invoke the code indirectly, such through the use of the shell server or the like.

Returning to block 511, if a determination is made that the code should be browser hosted, the handler component invokes the browser and instructs it to launch the code. At this point, the browser may simply launch the code, or may perform another process for identifying the appropriate host, such as the process illustrated in FIG. 6 and described next.

Figure 6:
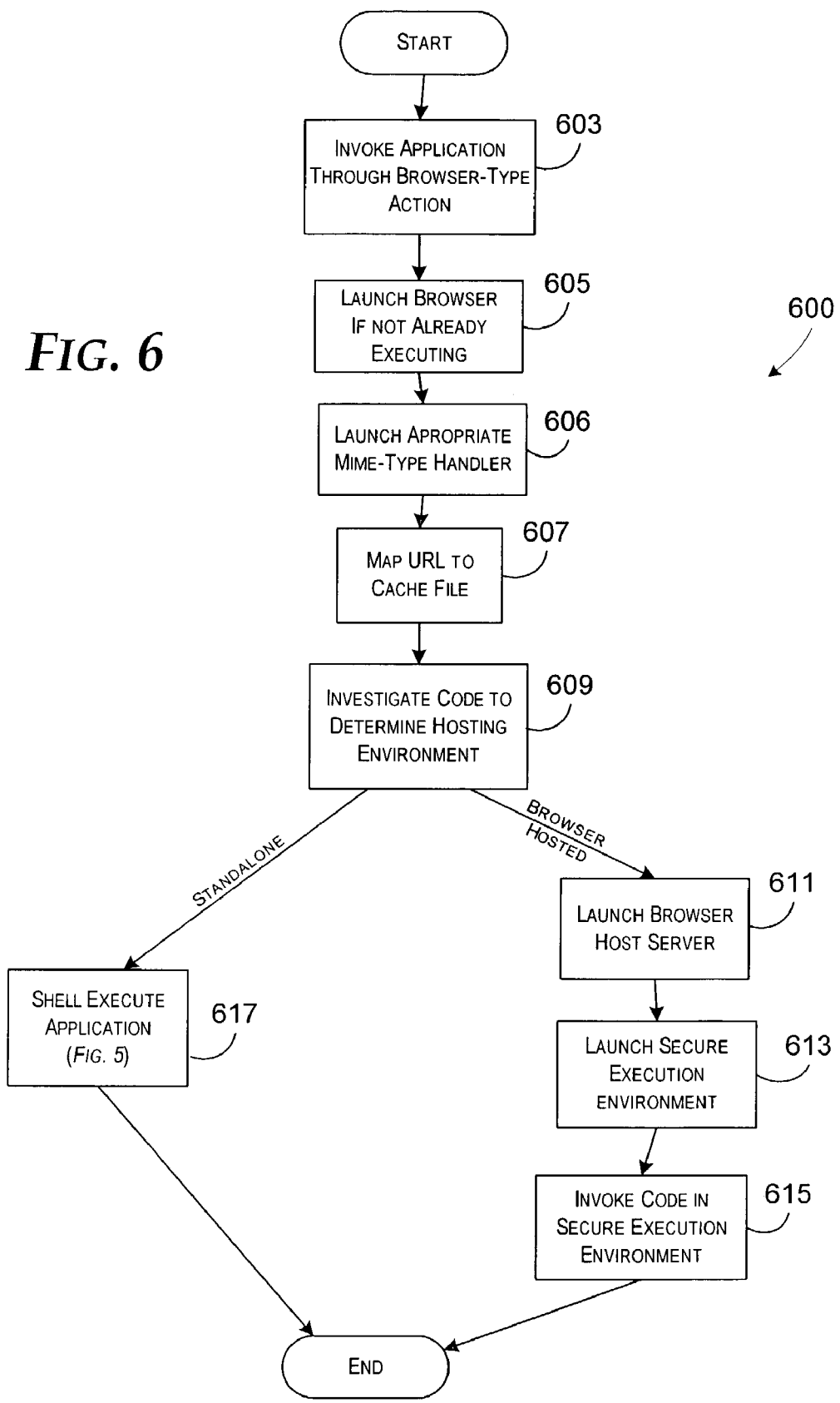
FIG. 6 is a logical state diagram generally illustrating a process for launching an application in one of plural hosting environments if launched from within a browser, in accordance with one implementation of the invention.

FIG. 6 is a logical flow diagram generally illustrating a process for determining an appropriate hosting environment in which to execute an application, and for launching the application in that environment when executed from within a browser. The process 600 begins at block 603 where an application is invoked in some fashion within the browser. There are several means by which the application may be invoked within the browser. For instance, a user may navigate to the application while browsing the Web, the user may enter the URL of the application into an address bar, or some other component may invoke the browser with instructions to launch the application.

At block 605, the browser is launched if it is not already executing. The browser may already be executing, such as the case where the user is currently browsing the Web and activates a link to the application. However, if the user invokes the application by a link to a local resource, the browser may not yet be executing. When executed, the browser may begin downloading the code for the application.

At block 606, an appropriate handler is executed for the mime-type of the application. As will be appreciated, code that is downloaded by browsing software includes a mime-type that identifies the type of code that is being downloaded. The browser is configured to pass the downloaded code to a handler registered to handle a particular mime-type. The browser may include standard handlers for particular mime-types, such as HTML or text. However, in this particular instance, it is envisioned that applications or code that can be hosted in more than one environment have a particular mime-type. A browser server proxy is registered to handle that particular mime-type. Thus, when downloading the application begins, as soon as the browser is able to determine the mime-type, the browser server proxy is invoked.

At block 607, the browser server proxy maps the URL of the application into a version of the application stored in cache. It should be appreciated that downloaded applications are first stored in cache and then that locally stored version is executed. Thus, the browser server proxy performs any translations necessary to allow the URL to refer to the cached file. In addition, the browser server proxy stores the URL of the application into a URL cache. In this way, the URL of the application is available to the system even if the browser purges its copy.

At block 609, the browser server proxy investigates the downloaded code to determine the appropriate hosting environment. In this example, the browser server proxy is configured to examine the bits of the code as they are downloaded by the browser. From an identifier within the code, the browser server proxy determines whether the code is browser hosted or standalone. If the code is standalone, the process 600 continues at block 617. If the code is browser hosted, the process 600 continues at block 611.

At block 611, the browser server proxy launches a browser server. In this example, the browser server actually includes the procedures for launching the secure execution environment and for interfacing between the browser and the executing code. It is possible for the same component to perform the functions of both the browser server proxy and the browser server, however efficiencies result from using separate components. For instance, using two components allows the system to delay launching the secure execution environment until after the appropriate host environment is determined.

At blocks 613 and 615, the browser server launches the secure execution environment and invokes the code in it. In this case, the application executes in browser-hosted mode within the browser window. The secure execution environment is owned by the browser, and is subject to any security policies appropriate for the application and the browser.

Returning to block 617, if it has been determined that the code is to be hosted in standalone mode, the browser server proxy causes the code to be shell executed. In this particular embodiment, that result is achieved by returning to the browser a notification of failure in attempting to execute the code. In other words, even though the browser server proxy is registered to handle the code's mime-type, it returns a notice that it was unable to complete the operation. That results in the browser handing off the code to the shell for execution. The shell may respond by performing a process for executing locally-stored code, such as the process described above in conjunction with FIG. 5.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer storage medium storing instructions for hosting an application in a computing system, the instructions to perform steps comprising:

receiving an indication to execute the application;

examining the application to determine an appropriate hosting environment, wherein examining the application comprises examining a code of the application for an indicator that identifies the appropriate hosting environment and comprises invoking a browser server proxy associated with the application, wherein the browser server proxy causes the application to be examined to determine if the application is intended to be hosted in a first environment, wherein the code is the same for the first hosting environment and a second hosting environment, and wherein the indicator is located within the code and determines whether the first hosting environment or the second hosting environment is appropriate;

if the current hosting environment is not the appropriate hosting environment, invoking the application in the appropriate hosting environment; and if the application is intended to be hosted in another hosting environment, the browser server proxy passes off the application to the other hosting environment, wherein passing off the application comprises issuing a false failure notification associated with launching the application.

2. The computer storage medium of claim 1, wherein the association between the browser server proxy and the application is based on a mime-type of the application.

3. The computer storage medium of claim 1, wherein if the application is intended to be browser hosted, the browser server proxy causes the application to be launched in a secure execution environment under the control of the browser environment.

4. The computer storage medium of claim 1, wherein the browser server proxy causes the application to be launched by invoking a browser server to execute the secure execution environment and to invoke the application in the secure execution environment.

5. The computer storage medium of claim 1, wherein examining the application comprises examining the application for a byte signature that identifies the appropriate hosting environment.

6. The computer storage medium of claim 1, wherein examining the application comprises examining a manifest file associated with the application for an identification of the appropriate hosting environment.

7. A computer-implemented method for hosting an application on a computing system, the method comprising:
identifying an instruction to launch the application in a first hosting environment;
receiving at least a portion of the application;
evaluating the portion of the application to determine an appropriate hosting environment for the application wherein evaluating the portion comprises:
invoking a host sniffer component to analyze the portion of the application to determine if the appropriate hosting environment is one of a predetermined set of hosting environments, and invoking a browser server proxy associated with the application, wherein the browser server proxy causes the application to be examined to determine if the application is intended to be hosted in the first environment;
and if the first hosting environment is consistent with the appropriate hosting environment, launching the application in the first hosting environment, wherein if the first hosting environment is inconsistent with the appropriate hosting environment, passing the application off to another component for further evaluation, wherein passing off the application comprises issuing a false failure notification associated with launching the application.

8. The computer-implemented method of claim 7, wherein identifying the instruction comprises receiving a notice that the application is being browser-executed.

9. The computer-implemented method of claim 7, wherein receiving at least the portion of the application comprises downloading a sufficient amount of the application to perform the evaluating step.

10. The computer-implemented method of claim 9, wherein the sufficient amount comprises a byte signature portion of the application that identifies the appropriate hosting environment.

11. The computer-implemented method of claim 9, wherein the sufficient amount comprises at least a part of a manifest that is associated with the application and that identifies the appropriate hosting environment.

12. The computer-implemented method of claim 7, wherein the method further comprises, prior to passing the application off, caching a location identifier associated with the application for use by the other component.

13. The computer-implemented method of claim 7, wherein the other component comprises a second hosting environment.

14. A computer storage medium storing computer-executable components for hosting an application in a computer system, the computer-executable components comprising:

a first code server operative to host the application in a first execution mode;
a second code server operative to host the application in a second execution mode;
a host sniffer configured to examine code for the application to identify an appropriate hosting environment in which to host the application, the appropriate hosting environment being one of either the first execution mode or the second execution mode, wherein the host sniffer is configured to examine the application by examining the application for a declarative indicator of the appropriate hosting environment, wherein the declarative indicator is located within a code that is the same for the first execution mode and the second execution mode; and
a handler component executing in either the first execution mode or the second execution mode and being operative to invoke the host sniffer to identify the appropriate hosting environment and to cause the application to be launched in the appropriate hosting environment, wherein if the application is not launched in the appropriate hosting environment passing the application off, wherein passing off the application comprises issuing a false failure notification associated with launching the application.

15. The computer storage medium of claim 14, wherein the first code server comprises a browser server component.

16. The computer storage medium of claim 15, wherein the handler component comprises a browser server proxy.

17. The computer storage medium of claim 14, wherein the second code server comprises a shell server component.

18. The computer storage medium of claim 17, wherein the handler component comprises a shell extension handler.

19. The computer storage medium of claim 14, wherein the first execution mode is a standalone mode, and the second execution mode is a browser hosted mode.

20. The computer storage medium of claim 14, wherein the declarative indicator comprises a byte signature within the application.

21. The computer storage medium of claim 14, wherein the declarative indicator comprises a portion of a manifest file associated with the application.

22. The computer storage medium of claim 21, wherein the portion of the manifest file comprises an application tag.

23. The computer storage medium of claim 14, wherein if the handler component was executing in the first execution mode and the appropriate hosting environment is the second execution mode, the handler component is operative to cause the second code server to host the application.

24. The computer storage medium of claim 23, wherein the first execution mode comprises a standalone mode and the second execution mode comprises a browser hosted mode, and the handler component causes the second code server to host the application by invoking a browser with instructions to execute the application.

25. The computer storage medium of claim 23, wherein the first execution mode comprises a browser hosted mode and the second execution mode comprises a standalone mode, and the handler component causes the second code server to host the application by invoking a shell extension handler associated with the application.

26. The computer storage medium of claim 14, wherein the handler component comprises an operating system loader.

27. A computer storage medium storing computer-executable components, the computer-executable components comprising:
a body of code including a declarative indicator identifying which of a plurality of distinct hosting environments the body of code is intended to be hosted in, wherein if the first hosting environment is inconsistent with the appropriate hosting environment, passing the application off to another component for further evaluation, wherein passing off the application comprises issuing a false failure notification associated with launching the application and wherein the plurality of distinct hosting environments comprises:

at least one hosting environment being a standalone;

at least the other hosting environment being a browser; and wherein the body of code hosted is the same in the standalone manner and the browser.

28. The computer storage medium of claim 27, wherein the body of code comprises an application.

29. The computer storage medium of claim 27, wherein a declarative indicator comprises a byte signature associated with one of the at least two distinct hosting environments.

30. The computer storage medium of claim 29, wherein the byte signature comprises a class ID associated with one of the at least two distinct hosting environments.

31. The computer storage medium of claim 27, wherein the declarative indicator comprises a portion of a manifest file associated with the body of code.

* * * * *